(12) United States Patent
Zhao

(10) Patent No.: US 12,233,927 B2
(45) Date of Patent: Feb. 25, 2025

(54) OUTDOOR CAMPING CART

(71) Applicant: Leying Zhao, Shenzhen (CN)

(72) Inventor: Leying Zhao, Shenzhen (CN)

( * ) Notice: Subject to any disclaimer, the term of this patent is extended or adjusted under 35 U.S.C. 154(b) by 324 days.

(21) Appl. No.: 17/967,194

(22) Filed: Oct. 17, 2022

(65) Prior Publication Data

US 2024/0124039 A1 Apr. 18, 2024

(51) Int. Cl.
| | | |
|---|---|---|
| *B60B 3/02* | (2006.01) | |
| *B62B 3/02* | (2006.01) | |
| *B62B 5/06* | (2006.01) | |

(52) U.S. Cl.
CPC . *B62B 3/02* (2013.01); *B62B 5/06* (2013.01)

(58) Field of Classification Search
CPC .. B62B 3/00; B62B 3/001; B62B 3/02; B62B 5/06; B60B 33/001; B60B 33/0021
See application file for complete search history.

(56) References Cited

U.S. PATENT DOCUMENTS

| | | | | |
|---|---|---|---|---|
| 8,251,391 | B2* | 8/2012 | Kohler | B60B 33/0049 16/30 |
| 2004/0232660 | A1* | 11/2004 | Chen | B62B 3/02 280/651 |
| 2015/0151771 | A1* | 6/2015 | Jin | B62B 5/0013 280/651 |

* cited by examiner

*Primary Examiner* — Bryan A Evans
(74) *Attorney, Agent, or Firm* — Birchwood IP

(57) ABSTRACT

A novel outdoor camping cart, comprising a cart body, the cart body comprises a body frame and a cloth bag mounted on the body frame, and the body frame comprises frame flat tubes, which are connected by flat tube connectors. The support tube is pressed into the middle connector through the riveting shaft, so that the bottom support structure is easy to assemble and disassemble. The two side walls of the bump damping connector in contact with the wheel assembly are provided with bump structures, so that the bump damping connector has a damping effect when rotating on the wheel assembly, the bump damping connector is integrally formed with plastic, and the structure is simple. The bump damping connector is connected to the wheel assembly, and it is actively steered through the left and right pull rods during steering. Especially on soft ground and grass, the steering is more labor-saving.

6 Claims, 8 Drawing Sheets

OUTDOOR CAMPING CART

TECHNICAL FIELD

The present application relates to the technical field of outdoor carts, in particular to a novel outdoor camping cart.

BACKGROUND

Outdoor camping carts are an essential tool for outdoor camping. Outdoor carts are widely used tools to facilitate peoples daily life, and are often used in outdoor camping activities. In outdoor activities such as camping, high requirements are placed on luggage handling tools, which are not only required to be able to adapt to the outdoor environment, but also required to be strong and durable, have a large capacity, and be suitable for storage to save storage space.

Although there are various types of outdoor carts on the market at present, their structures are similar and have many shortcomings. The connecting parts at the bottom of the first cart are connected by circlips, which are complicated to disassemble and inconvenient to install. The steering of the second wheel is passive steering, Which is laborious and inconvenient to operate. The third wheel is fixedly connected to the body frame, which is inconvenient for later maintenance.

For the problems in the related technologies, no effective solutions have been proposed so far.

SUMMARY

In view of the problems in the related art, the present invention proposes a novel outdoor camping cart to overcome the above-mentioned technical problems existing in the related art.

For this reason, the concrete technical solution of the present application is as follows:

An outdoor camping cart comprises a cart body, the cart body comprises a body frame and a cloth bag mounted on the body frame, the body frame comprises frame flat tubes, the frame flat tubes are connected by flat tube connectors, and bottom connectors are provided at lower left and right corners of a front end of the body frame, and handle fixing pipe connectors are provided at lower left and right corners of a rear end of the body frame, a wheel quick assembly is provided at the bottom of the bottom connector and the handle fixing pipe connector, a base support assembly is provided between the bottom connector and the handle fixing pipe connector, and a handle assembly is provided at the rear of the handle fixing pipe connector.

Preferably, the base support assembly comprises a bottom middle connector, and four support tubes are pressed into four corners of the bottom middle connector through riveting shafts, a rear end of the support tube in a front section is connected to the bottom connector, and a rear end of the support pipe in a rear section is connected to the handle fixing pipe connector.

Preferably, the handle assembly comprises a handle fixing member, a handle is provided at the top of the handle fixing member, a pull rod-middle flat tube is arranged in the middle of bottom of the handle fixing member, and a left pull rod and a right pull rod are slidably arranged at left and right ends of the handle fixing member, the bottom ends of the left pull rod and the right pull rod are arranged on the handle fixing pipe connector through a bump damping connector, and the bottom end of the pull rod-middle flat tube is provided with a pull rod lower plug through a rivet.

Preferably, the tops of four corners of the body frame are respectively provided with an upper corner piece, and a corner nut is screwed on the upper corner piece.

Preferably, the corner nut is integrally formed by injection molding.

Preferably, the wheel quick assembly comprises a frame assembly, and wheels are provided on the frame assembly, a bearing lower cover is inserted on the top of the frame assembly, a bearing is arranged on the bearing lower cover, and a wheel vertical shaft support is provided on the bearing.

Preferably, the wheel vertical shaft support is sleeved on the frame assembly, and a four-corner standpipe is sleeved, on the wheel vertical shaft support, the left and right side walls of the four-corner standpipe and the wheel vertical shaft support are provided with notches and limiting holes, a clip head is provided at the notch, a pin hole is provided on the side wall of the clip head, a pin is arranged in the limiting hole through a spring, and the number of the four-corner standpipes is four, and are respectively fixed on the bottom end of the bottom connector and the handle fixing pipe connecter.

Preferably, the clip head is clipped with the top of the frame assembly; and the pin is inserted into the inside of the limiting hole and the pin hole, thereby limiting the clip head.

The beneficial effects of the present application are:
1. The support tube is pressed into the middle connector through the riveting shaft, so that the bottom support structure is easy to assemble and disassemble. The two side walls of the bump damping connector in contact with the wheel assembly are provided with bump structures, so that the bump damping connector has a damping effect when rotating on the wheel assembly, and the bump damping connector is integrally formed with plastic, and the structure is simple. The bump damping connector is connected to the wheel assembly, and it is actively steered through the left and right pull rods during steering. Especially on soft ground and grass, the steering is more labor-saving. The corner nut is integrally formed by injection molding. When the corner nut is screwed to fix the cloth bag, the force it bears is smaller, which prevents damage.
2. By inserting the wheel vertical shaft support on the frame assembly inside the four-corner standpipe, pull the pin so that the tail end of the pin is released from the limiting hole on the side wall of the four-corner standpipe. At this time, the clip head is placed at the notch, and the top of the frame assembly is clipped. Finally, the pin is released, and the pin is inserted into the inside of the limiting hole and the pin hole, and then the clip head is limited, so that the clip head limit the frame assembly, and finally the entire wheel assembly is installed. The wheel assembly is disassembled through the opposite operation, the assembly and disassembly are simple and convenient, the later maintenance operation is convenient, and the use cost for consumers is low.

BRIEF DESCRIPTION OF DRAWINGS

In order to describe the embodiments of the present application or the technical solutions in the prior art more clearly, the following briefly introduces the accompanying drawings required in the embodiments. Obviously, the drawings in the following description are only some embodiments of the present application, and for those of ordinary skill in the art, other drawings can also be obtained from these drawings without creative effort.

REFERENCE SIGNS

1. Cart body; 2. Body frame; 3. Cloth bag; 4. Frame flat tube; 5. Flat tube connector; 6. Bottom connector; 7. Handle fixing pipe connector; 8. Wheel quick assembly; 9. Base support assembly; 10. Bottom middle connector; 11. Riveting shaft; 12. Support tube; 13. Frame assembly; 14. Wheel; 15. Bearing lower cover; 16. Bearing; 17, Wheel vertical shaft support; 18. Four-corner standpipe; 19, Notch; 20. Limiting hole; 21. Clip head; 22. Pin hole; 23. Spring; 24. Pin; 25. Handle assembly; 26. Handle fixing member; 27. Handle; 28. Pull rod-middle flat tube; 29. Left pull rod; 30. Right pull rod; 31. Bump damping connector; 32. Rivet; 33. Pull rod lower plug; 34, Upper corner piece; 35. Corner nut.

DETAILED DESCRIPTION

To further illustrate the embodiments, the present application provides accompanying drawings, which are part of the disclosure of the present application, and are mainly used to illustrate the embodiments, and can be used in conjunction with the relevant descriptions in the specification to explain the operation principles of the embodiments, and reference is made to these contents. Those of ordinary skill in the art will appreciate other possible embodiments and advantages of the present application. Components in the figures are not drawn to scale and similar component symbols are often used to represent similar components.

According to an embodiment of the present application, a novel outdoor camping cart is provided.

Embodiment 1

Figure 1:
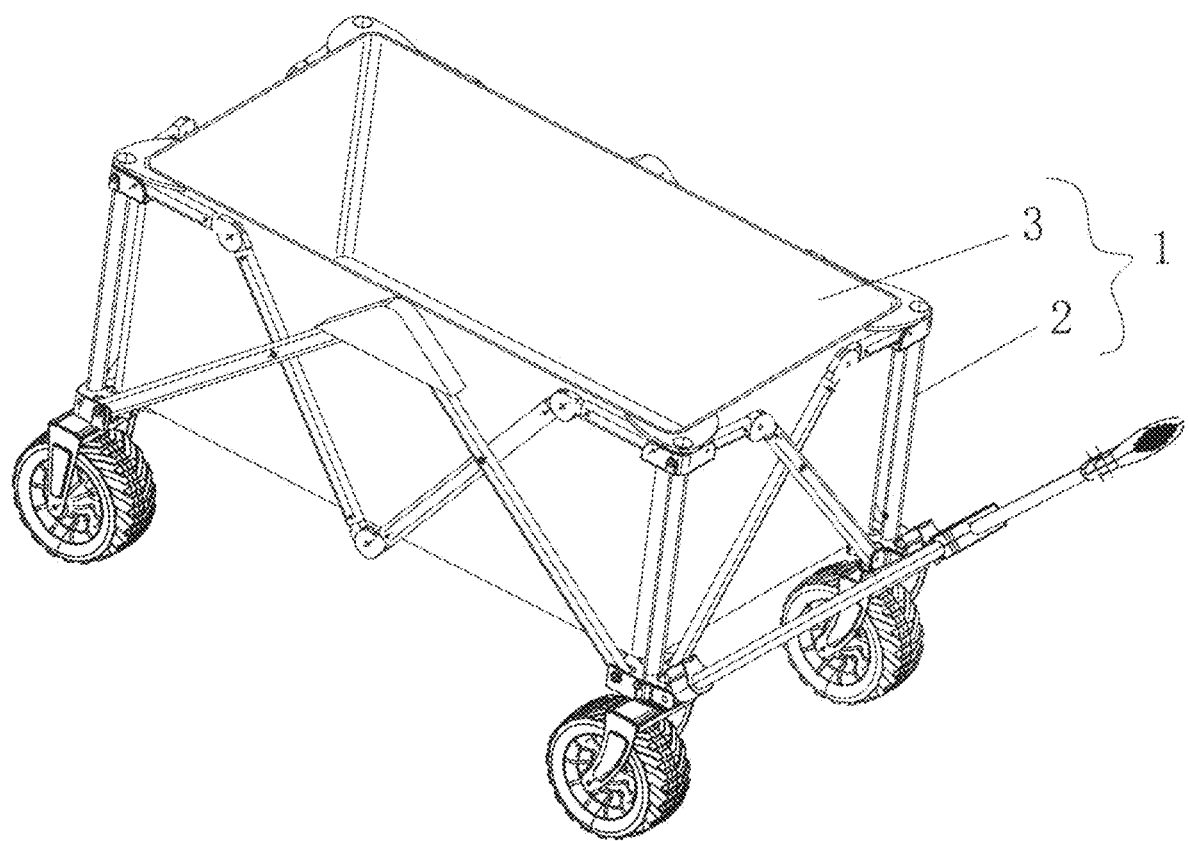
FIG. 1 is an overall side schematic structural diagram of the outdoor camping cart according to an embodiment of the present application.
Figure 2:
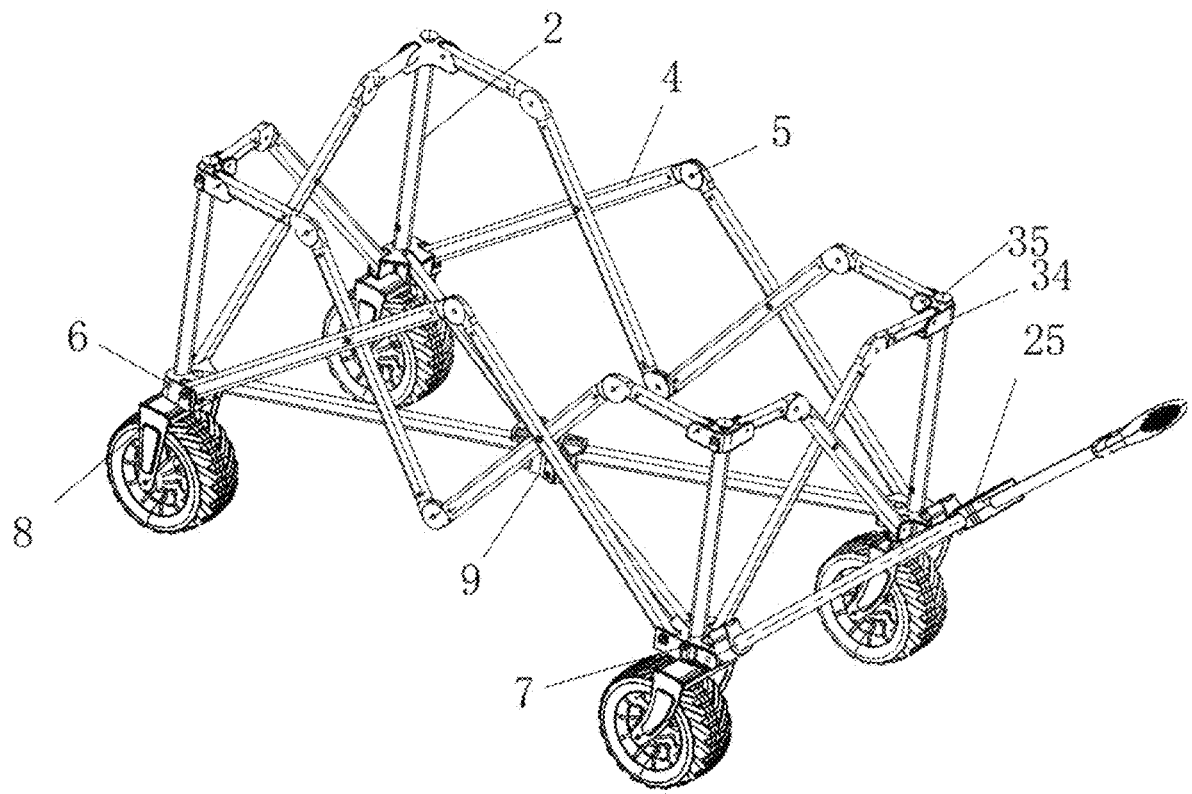
FIG. 2 is a schematic structural diagram of a body frame of the outdoor camping cart according to an embodiment of the present application.
Figure 3:
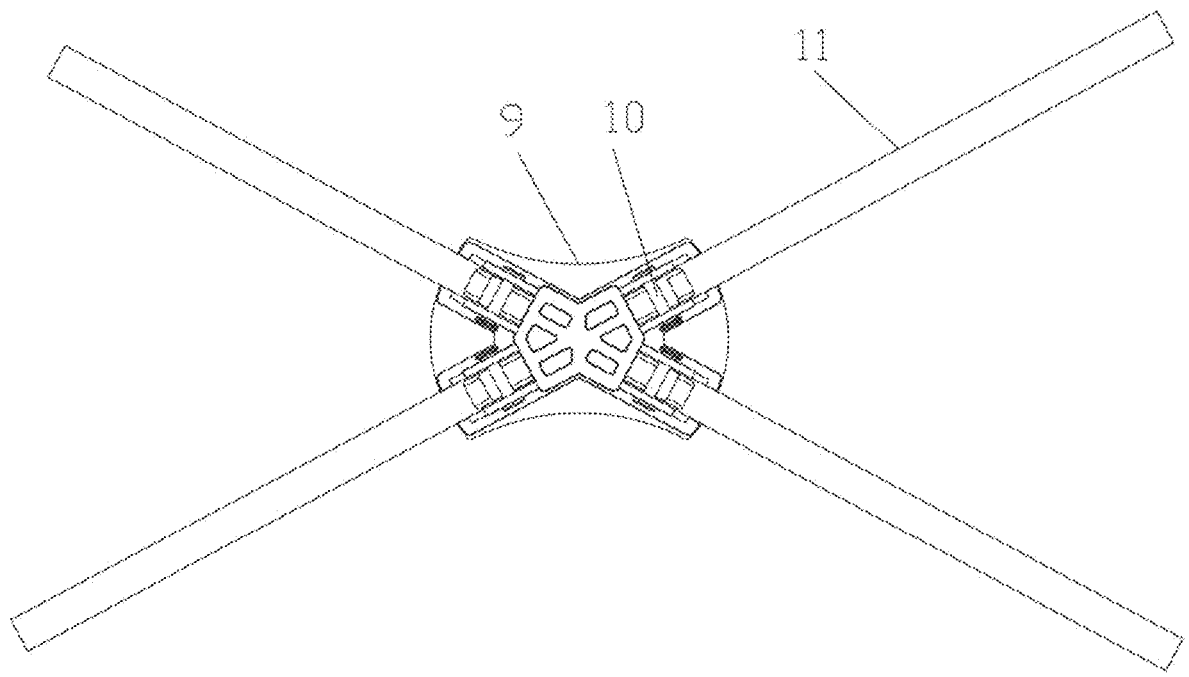
FIG. 3 is a schematic structural diagram of a base support assembly of the outdoor camping cart according to an embodiment of the present application.
Figure 4:
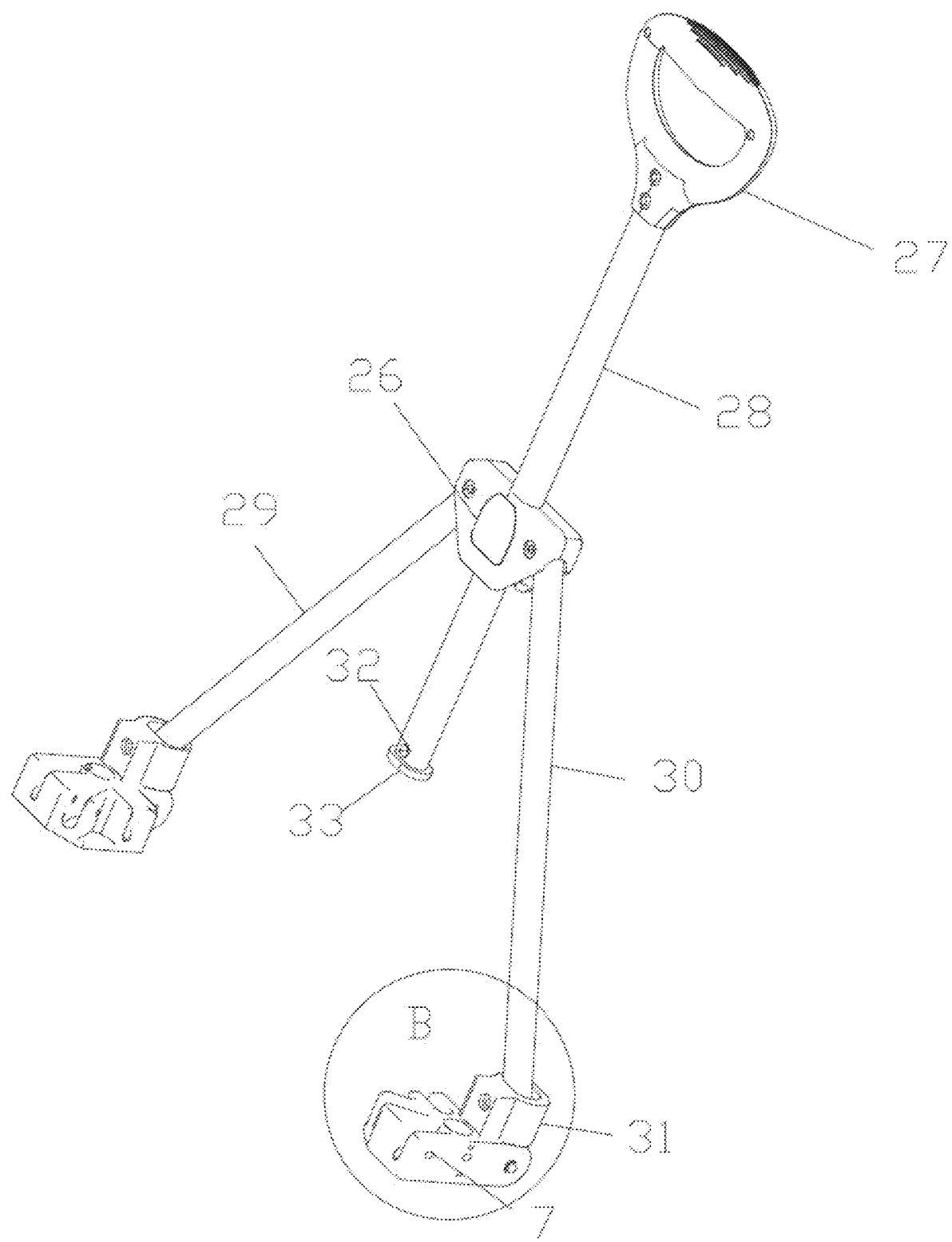
FIG. 4 is a schematic structural diagram of a handle assembly of the outdoor camping cart according to an embodiment of the present application.
Figure 5:
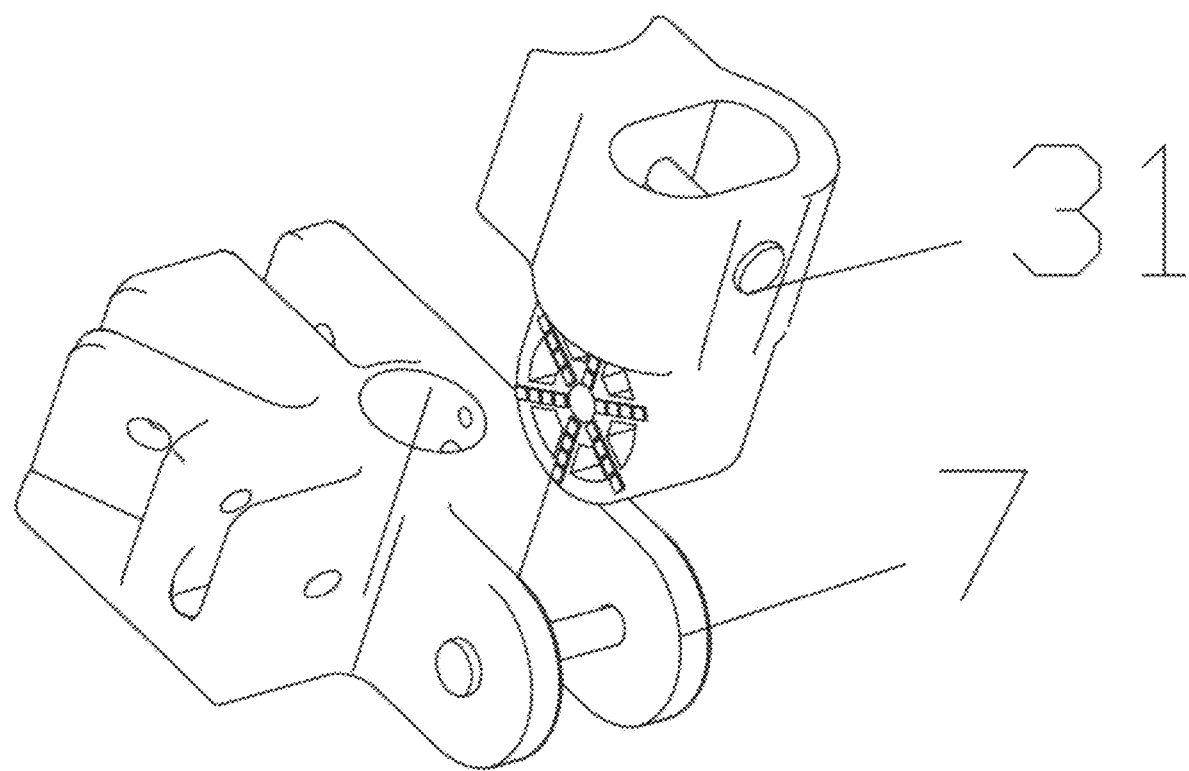
FIG. 5 is a schematic structural diagram of a split structure at position B of the outdoor camping cart according to an embodiment of the present application.
Figure 6:
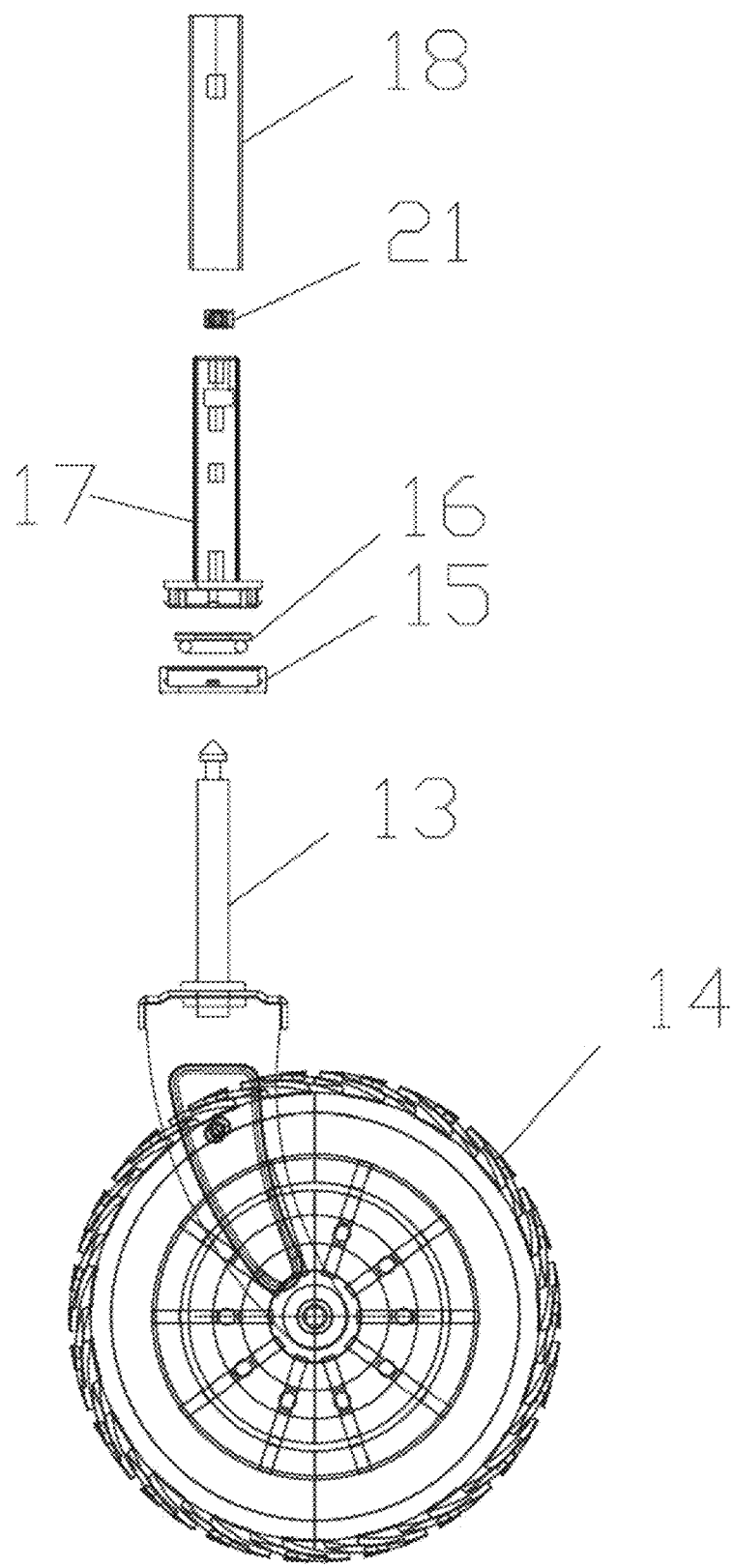
FIG. 6 is a side schematic structural diagram of the wheel quick assembly of the outdoor camping cart according to an embodiment of the present application.
Figure 7:
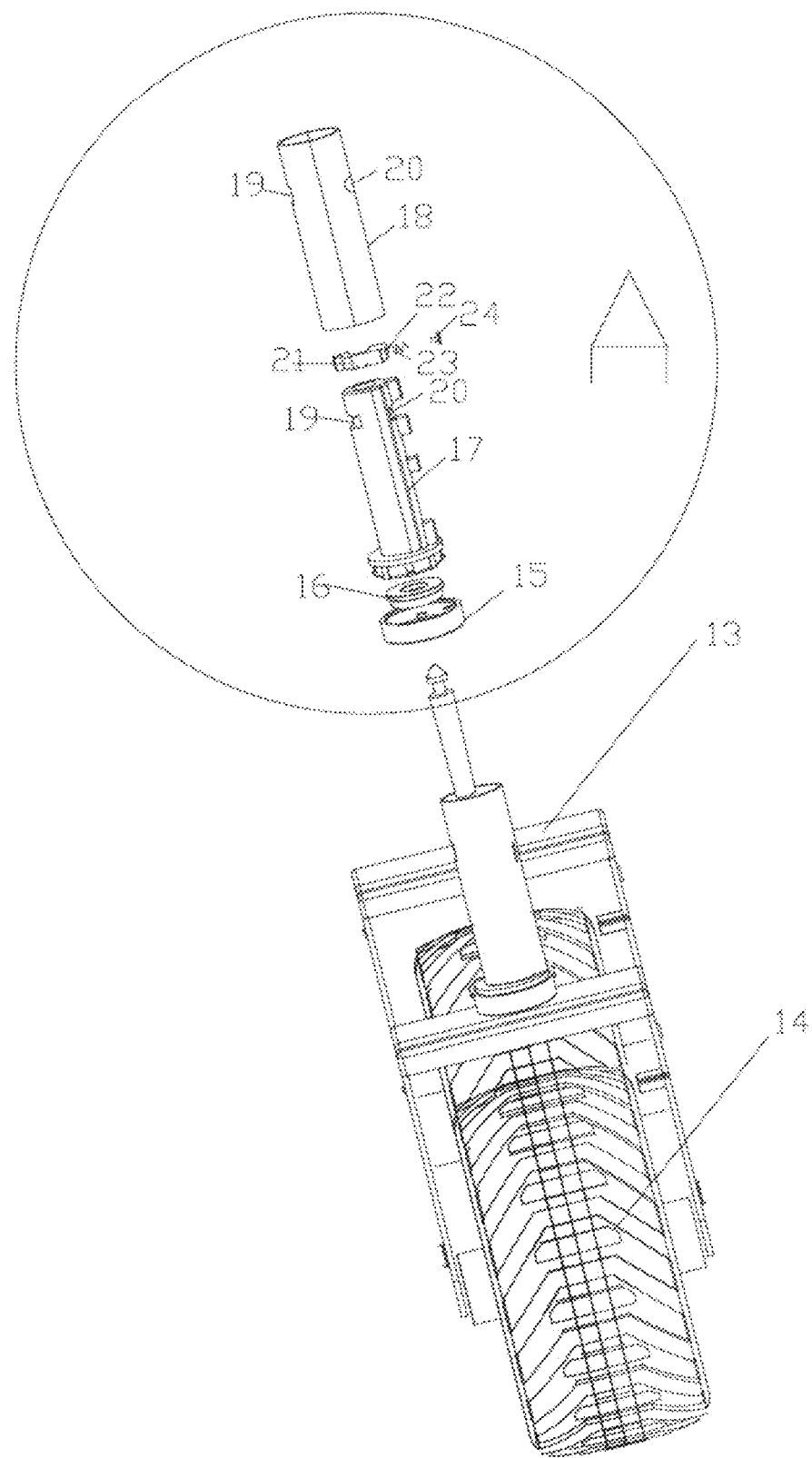
FIG. 7 is a schematic three-dimensional structural diagram of the wheel quick assembly of the outdoor camping cart according to an embodiment of the present application.
Figure 8:
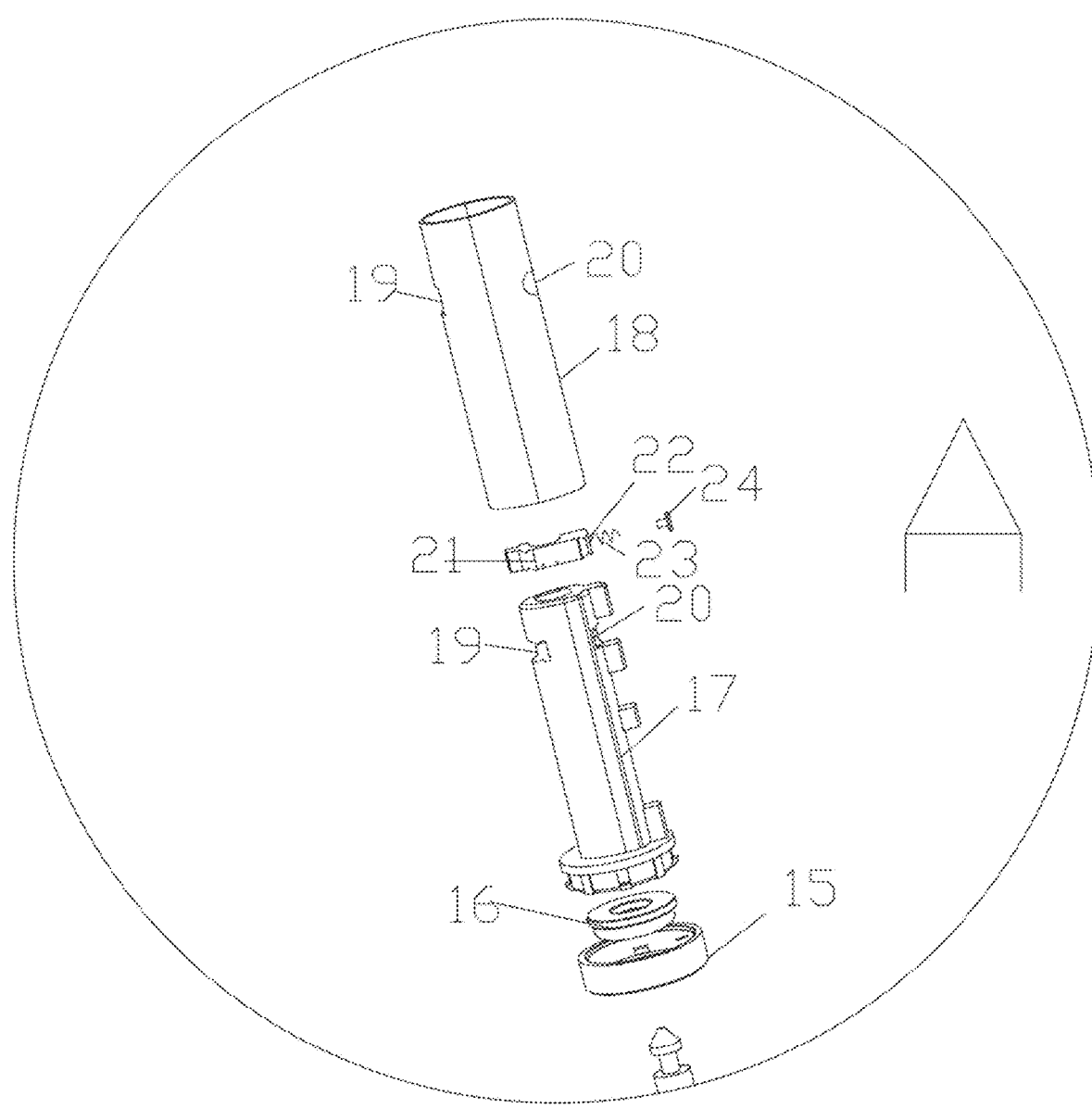
FIG. 8 is an enlarged schematic structural diagram at position A of the outdoor camping cart according to an embodiment of the present application.

As shown in FIGS. 1-8, a novel outdoor camping cart according to an embodiment of the present application, comprises a cart body 1, the cart body 1 comprises a body frame 2 and a cloth bag 3 mounted on the body frame 2, the body frame 2 comprises frame flat tubes 4, the frame flat tubes 4 are connected by flat tube connectors 5, and bottom connectors 6 are provided at lower left and right corners of a front end of the body frame 2, and handle fixing pipe connectors 7 are provided at lower left and right corners of a rear end of the body frame 2, a wheel quick assembly 8 is provided at the bottom of the bottom connector 6 and the handle fixing pipe connector 8, a base support assembly 9 is provided between the bottom connector 6 and the handle fixing pipe connector 7, and a handle assembly 25 is provided at the rear of the handle fixing pipe connector 6. The base support assembly 9 comprises a bottom middle connector 10, and four support tubes 12 are pressed into four corners of the bottom middle connector 10 through riveting shafts 11, a rear end of the support tube 12 in a front section is connected to the bottom connector 6, and a rear end of the support pipe 12 in a rear section is connected to the handle fixing pipe connector 7. The support tube is pressed into the middle connector through the riveting shaft, so that the bottom support structure is easy to assemble and disassemble.

Embodiment 2

As shown in FIGS. 1-8, a novel outdoor camping cart according to an embodiment of the present application, comprises a cart body 1, the cart body 1 comprises a body frame 2 and a cloth bag 3 mounted on the body frame 2, the body frame 2 comprises frame flat tubes 4, the frame flat tubes 4 are connected by flat tube connectors 5, and bottom connectors 6 are provided at lower left and right corners of a front end of the body frame 2, and handle fixing pipe connectors 7 are provided at lower left and right corners of a rear end of the body flume 2, a wheel quick assembly 8 is provided at the bottom of the bottom connector 6 and the handle fixing pipe connector 8, a base support assembly 9 is provided between the bottom connector 6 and the handle fixing pipe connector 7, and a handle assembly 25 is provided at the rear of the handle fixing pipe connector 6. The handle assembly 25 comprises a handle fixing member 26, a handle 27 is provided at the top of the handle fixing member 26, a pull rod-middle flat tube 28 is arranged in the middle of bottom of the handle fixing member 26, and a left pull rod 29 and a right pull rod 30 are slidably arranged at left and right ends of the handle fixing member 26, the bottom ends of the left pull rod 29 and the right pull rod 30 are arranged on the handle fixing pipe connector 7 through a bump damping connector 31, and the bottom end of the pull rod-middle flat tube 28 is provided with a pull rod lower plug 33 through a rivet 32. The two side walls of the bump damping connector in contact with the wheel assembly are provided with bump structures, so that the bump damping connector has a damping effect when rotating on the wheel assembly, and the bump damping connector is integrally formed with plastic, and the structure is simple. The bump damping connector is connected to the wheel assembly, and it is actively steered through the left and right pull rods during steering.

The tops of four corners of the body frame 2 are respectively provided with an upper corner piece 34, and a corner nut 35 is screwed on the upper corner piece 34. The corner nut 35 is integrally formed by injection molding. When the corner nut is screwed to fix the cloth bag, the force it bears is smaller, which prevents damage.

Embodiment 3

As shown in FIGS. 1-8, a novel outdoor camping cart according to an embodiment of the present application, comprises a cart body 1, the cart body 1 comprises a body frame 2 and a cloth bag 3 mounted on the body frame 2, the body frame 2 comprises frame flat tubes 4, the frame flat tubes 4 are connected by flat tube connectors 5, and bottom connectors 6 are provided at lower left and right corners of a front end of the body frame 2, and handle fixing pipe connectors 7 are provided at lower left and right corners of a rear end of the body frame 2, a wheel quick assembly 8 is provided at the bottom of the bottom connector 6 and the handle fixing pipe connector 8, a base support assembly 9 is provided between the bottom connector 6 and the handle fixing pipe connector 7, and a handle assembly 25 is provided at the rear of the handle fixing pipe connector 6. The wheel quick assembly 8 comprises a frame assembly 13, and wheels 14 are provided on the frame assembly 13, a bearing lower cover 15 is inserted on the top of the frame assembly 13, a bearing 16 is arranged on the bearing lower cover 15, and a Wheel vertical shaft support 17 is provided on the bearing 16. The wheel vertical shaft support 17 is sleeved on the frame assembly 13, and a four-corner standpipe 18 is sleeved on the wheel vertical shaft support 17, the left and right side walls of the four-corner standpipe 18 and the wheel vertical shaft support 17 are provided with notches 19 and limiting holes 20, a clip head 21 is provided at the notch 19, a pin hole 22 is provided on the side wall of the clip head 21, a pin 24 is arranged in the limiting hole 20 through a spring 23, and the number of the four-corner standpipes 18 is four, and are respectively fixed on the bottom end of the bottom connector 6 and the handle fixing pipe connecter 7. The clip head 21 is clipped with the top of the frame assembly 13, and the pin 24 is inserted into the inside of the limiting hole 20 and the pin hole 22, thereby limiting the clip head.

By inserting the wheel vertical shaft support 17 on the frame assembly 13 inside the four-corner standpipe 18, pull the pin 24 so that the tail end of the pin 24 is released from the limiting hole 20 on the side wall of the four-corner standpipe 18. At this time, the clip head 21 is placed at the notch, and the top of the frame assembly 13 is clipped. Finally, the pin 24 is released, and the pin 24 is inserted into the inside of the limiting hole 20 and the pin hole 22, and then the clip head is limited, so that the clip head limit the frame assembly 13, and finally the entire wheel assembly is installed. The wheel assembly is disassembled through the opposite operation, the assembly and disassembly are simple and convenient, the later maintenance operation is convenient, and the use cost for consumers is low.

The above are only preferred embodiments of the present application, and are not intended to limit the present application. Any modifications, equivalent replacements, improvements, etc. made within the spirit and principles of the present application shall fall into the protection scope of the present application.

What is claimed is:

1. An outdoor camping cart, comprising a cart body, wherein the cart body comprises a body frame and a cloth bag mounted on the body frame,
the body frame comprises frame flat tubes, and the frame flat tubes are connected by flat tube connectors, and bottom connectors are provided at lower left and right corners of a front end of the body frame, and handle fixing pipe connectors are provided at lower left and right corners of a rear end of the body frame, a wheel quick assembly is provided at bottoms of the bottom connectors and the handle fixing pipe connectors,
a base support assembly is provided between the bottom connectors and the handle fixing pipe connectors, and a handle assembly is provided at rears of the handle fixing pipe connectors;
wherein the wheel quick assembly comprises a frame assembly, and wheels are provided on the frame assembly, a bearing lower cover is inserted on a top of the frame assembly, a bearing is arranged on the bearing lower cover, and a wheel vertical shaft support is provided on the bearing;
wherein the wheel vertical shaft support is sleeved on the frame assembly, and a four-corner standpipe is sleeved on the wheel vertical shaft support, left and right side walls of the four-corner standpipe and the wheel vertical shaft support are provided with notches and limiting holes;
a clip head is provided at the notches, a pin hole is provided on a side wall of the clip head, a pin is arranged in the limiting holes through a spring,
there are four four-corner standpipes, which are respectively fixed on bottom ends of the bottom connectors and the handle fixing pipe connectors.

2. The outdoor camping cart according to claim 1, wherein the base support assembly comprises a bottom middle connector, and four support tubes are pressed into four corners of the bottom middle connector through riveting shafts, a rear end of lone support tube in a front section is connected to the bottom connectors, and a rear end of the support tube in a rear section is connected to the handle fixing pipe connectors.

3. The outdoor camping cart according to claim 1, wherein the handle assembly comprises a handle fixing member, a handle is provided at a top of the handle fixing member, a pull rod-middle flat tube is arranged in a middle of a bottom of the handle fixing member, and a left pull rod and a right pull rod are arranged at left and right ends of the handle fixing member,
bottom ends of the left pull rod and the right pull rod are arranged on the handle fixing pipe connectors through a bump damping connector, and a bottom end of the pull rod-middle flat tube is provided with a pull rod lower plug through a rivet.

4. The outdoor camping cart according to claim 1, wherein tops of four corners of the body frame are respectively provided with an upper corner piece, and a corner nut is screwed on the upper corner piece.

5. The outdoor camping cart according to claim 4, wherein the corner nut is integrally formed by injection molding.

6. The outdoor camping cart according to claim 1, wherein the clip head is clipped with the top of the frame assembly, and the pin is inserted into the inside of the limiting holes and the pin hole, thereby limiting the clip head.

* * * * *